United States Patent [19]
Manthuruthil et al.

[11] Patent Number: 5,359,514
[45] Date of Patent: Oct. 25, 1994

[54] METHOD AND APPARATUS FOR FACILITATING COMPREHENSION OF ON-LINE DOCUMENTS

[75] Inventors: George C. Manthuruthil, Coppell; Shrikant N. Parikh, Mesquite; Hari N. Reddy, Colleyville, all of Tex.

[73] Assignee: International Business Machines Corporation, Armonk, N.Y.

[21] Appl. No.: 101,606

[22] Filed: Aug. 3, 1993

[51] Int. Cl.$^5$ ............................................. G06F 15/38
[52] U.S. Cl. ........................... 364/419.11; 364/419.05
[58] Field of Search ...................... 364/419.11, 419.13, 364/419.14, 419.19

[56] References Cited

U.S. PATENT DOCUMENTS

| | | | |
|---|---|---|---|
| 4,384,329 | 5/1983 | Rosenbaum et al. | 364/419.13 |
| 4,456,973 | 6/1984 | Carlgren et al. | 364/419.13 |
| 4,773,039 | 9/1988 | Zamora | 364/419.14 |
| 5,256,067 | 10/1993 | Gildea et al. | 364/419.01 |
| 5,283,737 | 2/1994 | Van Praag | 364/419.14 |

OTHER PUBLICATIONS

Newsbytes News Network; "Japanese Ministry's Multi-Language Translation Sys"; Dec. 17, 1992; Tokyo, Japan. Abstract.

Primary Examiner—Donald E. McElheny, Jr.
Attorney, Agent, or Firm—A. Bruce Clay

[57] ABSTRACT

The present invention improves the comprehensibility of a document being read on a computer system. Rather than requiring a reader to stop and look up the meaning of a word, either on-line or with a printed copy, the present invention will automatically translate unknown words into words known to the reader. By checking each word in a document against a known word list maintained on the computer, the present invention improves the readers comprehension of a document as well as simplifies the reading thereof.

4 Claims, 5 Drawing Sheets

METHOD AND APPARATUS FOR FACILITATING COMPREHENSION OF ON-LINE DOCUMENTS

TECHNICAL FIELD OF THE INVENTION

This invention relates in general to computer software, and in particular to a method and apparatus for facilitating comprehension of on-line documents.

BACKGROUND OF THE INVENTION

With the advent of computer on-line access to remote databases such as libraries, as well as the use of computers to review documents, it has frequently been necessary to resort to a dictionary and/or thesaurus to understand the material. Anytime it is necessary to refer to either an on-line reference or a printed reference to understand the meaning of words, the effort becomes tedious. Thus, if material being read is considerably above the reading level of the user, comprehension may suffer considerably. Thus, there is a need for a better mechanism to allow a reader to understand a document which demands above average and/or uncommon vocabulary without losing continuity.

SUMMARY OF THE INVENTION

The present invention provides a method and apparatus for facilitating comprehension of an on-line document in a fashion which substantially reduces or eliminates the problems in the prior art. The present invention allows a computer system to automatically provide words that are known to the reader.

In accordance with one aspect of the present invention, a method is provided for improving the comprehensibility of a document on a computer system. All words in the document are checked to identify a list of unknown words. The unknown words are determined by comparing all words to a list of known words maintained on the computer system. The unknown words are then supplemented with synonyms which are known to the reader. The document is displayed to the reader with the unknown words and the synonyms.

It is a technical advantage of the present invention in that it is no longer necessary to utilize either a hard copy dictionary/thesaurus or an on-line dictionary/thesaurus to look up unknown words. The reader of a document is presented with a translation already done obviating the necessity to constantly revert back and forth from the document to a reference.

BRIEF DESCRIPTION OF THE DRAWINGS

For a more complete understanding of the present invention and the advantages thereof, reference is now made to the Detailed Description taken in conjunction with the attached Drawings, in which.

DETAILED DESCRIPTION OF THE INVENTION

Figure 1:
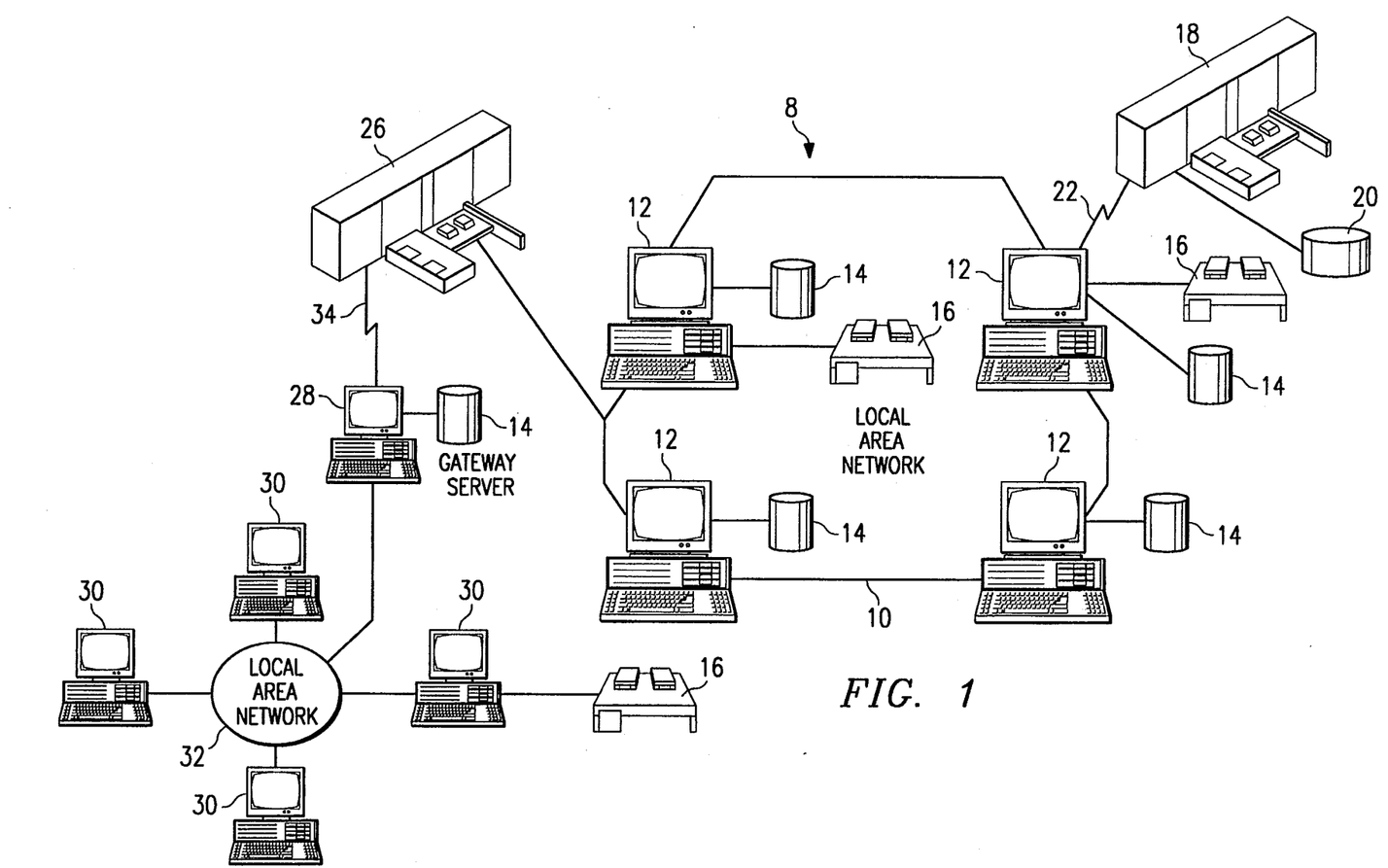
FIG. 1 is a schematic illustration of a data processing system in accordance with the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Workstations (IWS) coupled to a host processor may be utilized for each such network. As is common in such data processing systems, each individual computer may be coupled to a storage device 14 and/or a printer/output device 16.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a subsystem control unit/communications controller 26 and communications link 34 to a gateway server 28. Gateway server 28 is preferably an individual computer or IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and, similarly, LAN 10 may be located a substantial distance from LAN 32. For example, LAN 32 may be located in California, while LAN 10 may be located within Texas, and mainframe computer 18 may be located in New York.

Figure 2:
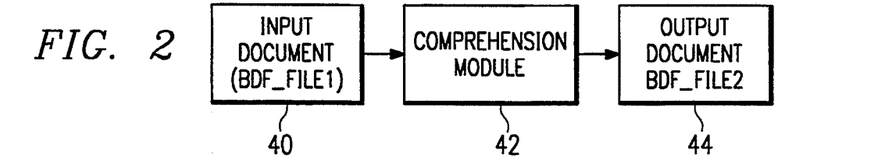
FIG. 2 is a diagram illustrating the broad concept of the present invention.

Referring to FIG. 2, a flowchart indicates the overall concept of the present invention. At block 40, a document Is input to a computer system creating a Business Document File (BDF_FILE1). At block 42, the document is processed through a comprehension module signifying the present invention. In summary, the present invention reviews the input document, parses the document, eliminates stem words (i.e., the, a, and, etc.), checks the vocabulary files included in the present invention, and translates any words not known to the user. After completing the translation process in the comprehension module of block 42, the document input at block 40 is output as a Business Document File with translation (BDF_FILE2). Thus, by utilizing the present invention, a user would be able to read a document with all words therein translated into words known and understood by the user without the necessity to look up meanings of words in dictionaries.

In order to properly utilize the present invention, it is necessary to install two databases onto the computer system in which the present invention is used. The first database is a Business Thesaurus File (BTF). The BTF is a complete repository of terms for a specific business the user is interested in. Each entry in the BTF comprises a word and a set of synonyms associated with each word.

In addition, it is necessary to use a Personal Vocabulary File database (PVF). The PVF is a repository of words that are known to or encountered by a user. The PVF file can be managed as a text file which allows manual entering and/or deletion of words. The PVF file can be initialized in several ways. Entries may be made manually into the PVF file either using a simple electronic editor/word processing software or by providing an interaction panel which allows the direct entry of data. Alternatively, a standard business database of the correct proficiency level can be used to initialize the PVF file. For example, a vocabulary database reflecting a tenth grade level of proficiency can be used to initialize the PVF file. Another alternative would be to allow all words encountered for a predefined period to be entered into the PVF file and then appropriate adjustments could be made.

Figure 3:
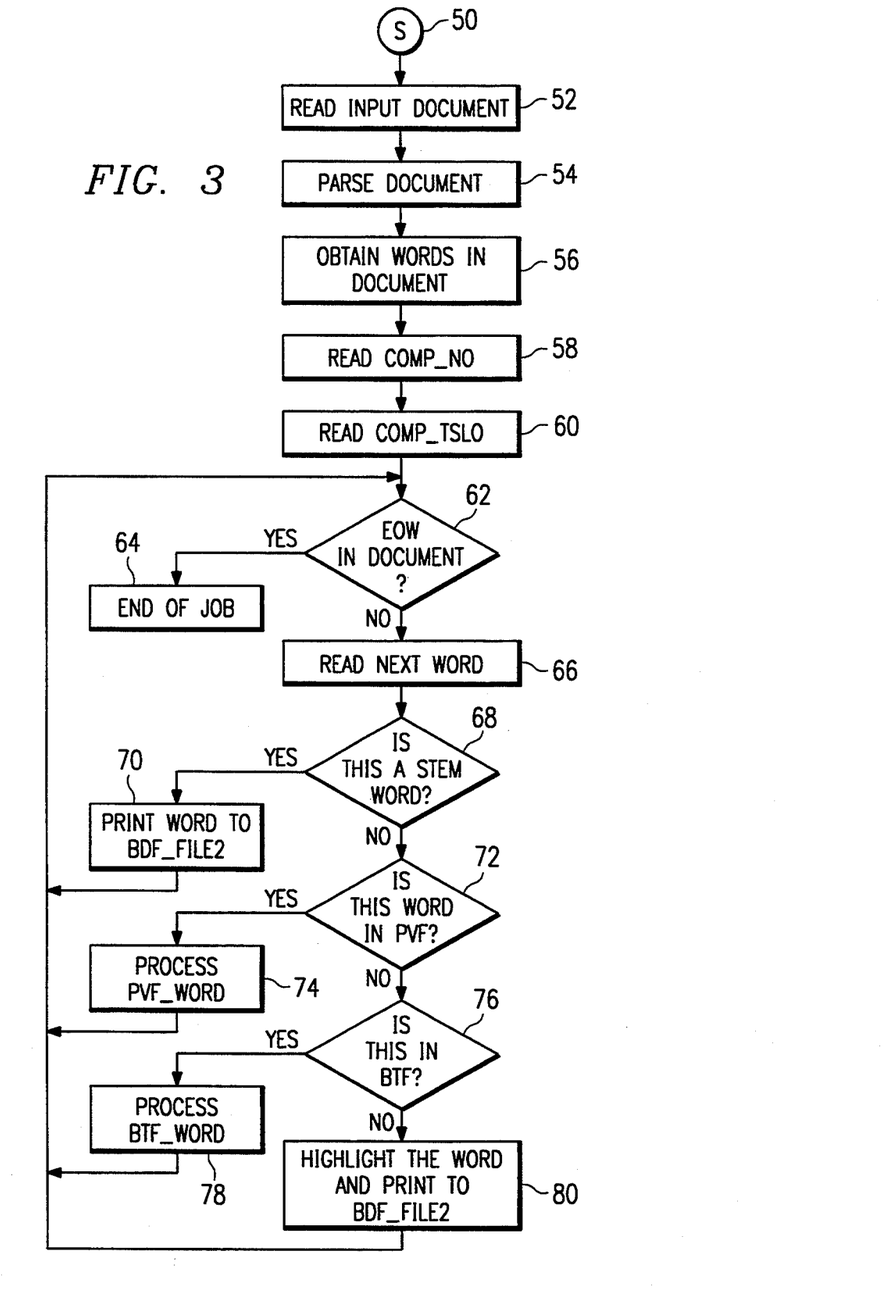
FIGS. 3, 4, 5, 6, and 7 are flowcharts illustrating the present invention.

Referring to FIGS. 3, 4, 5, 6, and 7, flowcharts illustrating the present invention are shown. Referring first to FIG. 3, the present invention starts at 50 followed by reading of the input document at block 52. The input document is then parsed at block 54. At block 56, the words in the document are obtained by the present invention, i.e., the present invention goes through each word in the input document one at a time. At block 58, a COMP_NO and at block 60 a COMP_TSLO parameters are read. These parameters are set optionally by a user of the system and are used to set guidelines. In particular, the COMP_NO is used to tell the present invention how many occurrences of a particular word are required before it is assumed that the user understands the meaning thereof. The COMP_TSLO is used to indicate (using a predefined period of time) how much time since the last occurrence of a word has occurred. Thus, if a user has not seen a particular word in a period of time greater than the parameter set for COMP_TSLO it will be assumed that the user no longer remembers the meaning of the word.

It is then determined at decision block 62 whether or not the last word in the document has been reached. If the response to decision block 62 is yes, the end of job is indicated at block 64. If the response to decision block 62 is no, the next word is read at block 66.

At decision block 68, it is determined whether or not the next word is a stem word (i.e., a, an, and, the, etc.). If the response to decision block 68 is yes, the word is printed to a BDF_FILE2 (i.e., the Business Document File which will be presented to the user for reading upon completion of all translations. If the response to decision block 68 is no, it is determined at decision block 72 whether or not the word is in the PVF (i.e., is this a word that the user knows). If the response to decision block 72 is yes, the word is processed as a PVF_WORD (i.e., the known word is processed to include appropriate flag encounter settings).

If the response to decision block 72 is no, it is determined at decision block 76 whether or not the word is in the BTF. If the response to decision block 76 is yes, at block 78 the word is processed as a BTF_WORD (i.e. the word is considered to be beyond the level of the user and synonyms are therefore presented). If the response to decision block 76 is no, the word is considered to be unknown and is highlighted and printed to the BDF_FILE2 for display upon completion of translation at block 80. Subsequent to block 70, block 74, block 78 or block 80, the present invention returns to decision block 62 as previously described above.

Figure 4:
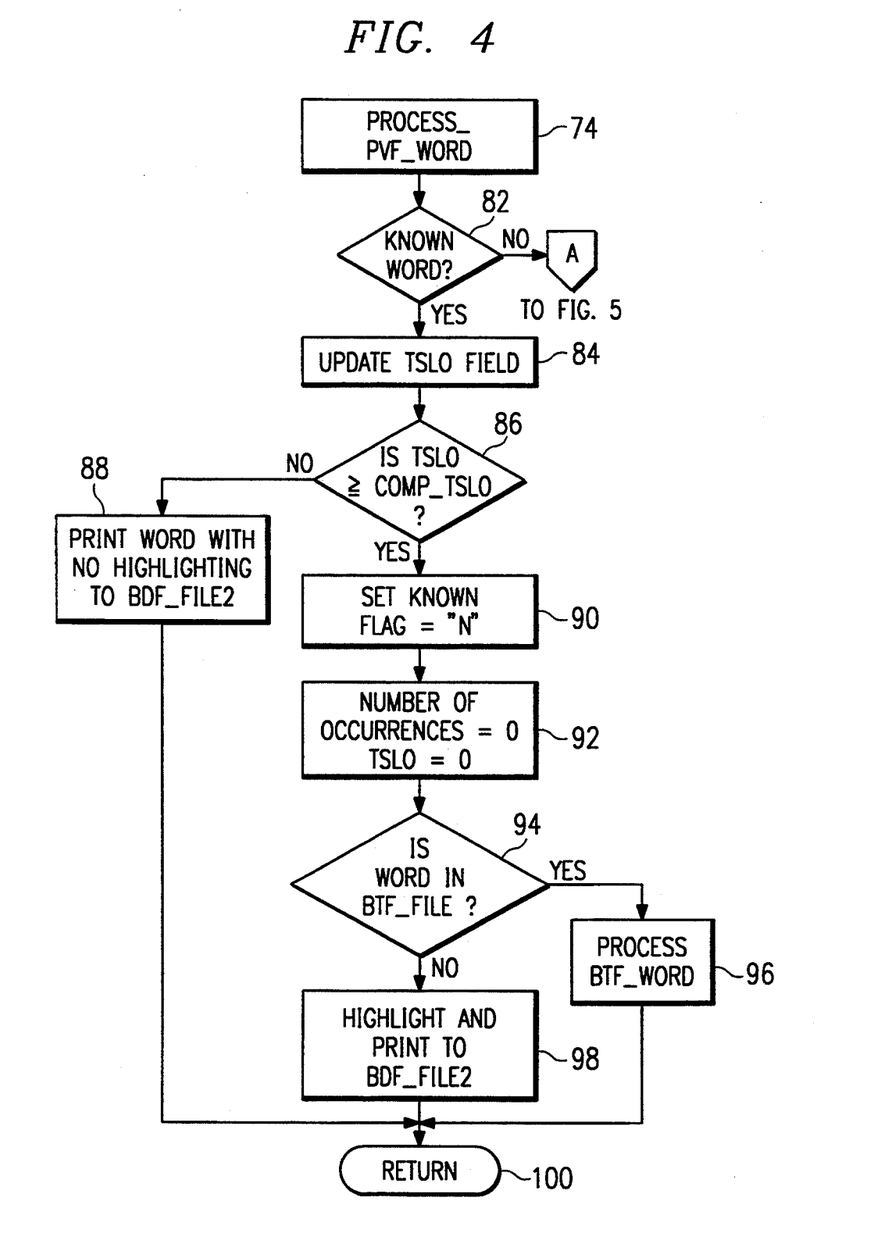

Referring to FIG. 4, process PVF_WORD as shown in block 74 of FIG. 3 is described in greater detail. At decision block 82, it is determined whether or not the word is known to the user. If the response to decision block 82 is no, the present invention proceeds to connector A as will be discussed in greater detail with FIG. 5. If the response to decision block 82 is yes, the PVF file has a TSLO (Time Since Last Occurrence) field updated at block 84. This TSLO field is then compared to the COMP_TSLO parameter as previously described at decision block 86. If it is determined at decision block 86 that the TSLO is not greater than or equal to the COMP_TSLO, the word is printed without highlighting to the BDF_FILE2 at block 88. If it is determined at decision block 86 that the TSLO is greater than or equal to the COMP_TSLO, a known word flag is set equal to N (for no) at block 90. By setting the known flag equal to N at block 90, the word is now indicated to be a new word not known to the user. At block 92, a number of occurrences for this word Is set equal to zero (i.e., treated as a new occurrence).

At decision block 94, it is then determined whether or not this word is in the BTF_FILE. If the response to decision block 94 is yes, the word is processed as a BTF_WORD as will be discussed in greater detail in reference to FIG. 7. If the response to decision block 94 is no, the word is highlighted (to indicate an unknown word) and printed to the BDF_FILE2 at block 98. Subsequent to block 88, block 96, or block 98 the present invention returns to decision block 62 of FIG. 3.

Figure 5:
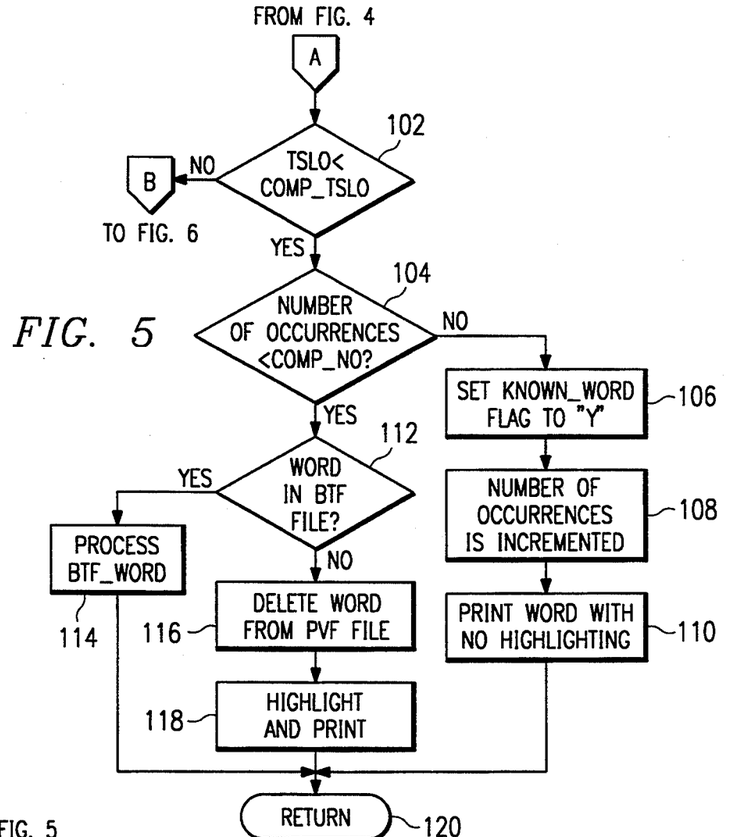

Referring to FIG. 5, connector A from the no branch of decision block 82 in FIG. 4 is described in greater detail. At decision block 102, it is determined whether the TSLO field of the PVF file is less than the COMP_TSLO. If the response to decision block 102 is no, the present invention proceeds to connector B which will be discussed in greater detail in reference to FIG. 6. If the response to decision block 102 is yes, it is determined at decision block 104 whether or not the number of occurrences field of the PVF file is less than the COMP_NO parameter. If the response to decision block 104 is no, the known word flag is set to Y (indicating that the word has met the COMP_TSLO and COMP_NO parameters as set by the user). At block 108, the number of occurrences field of the PVF file is incremented to indicate this occurrence. At block 110, the word is printed with no highlighting.

Returning to decision block 104, if the response thereto is yes, it is determined at decision block 112 whether or not the word is in the BTF file. If the response to decision block 112 is yes, at block 114 the word is processed as a BTF_WORD as will be discussed with reference to FIG. 7. If the response to decision block 112 is no, the word is deleted from the PVF file at block 116 followed by highlighting and printing the word at block 118. Subsequent to block 110, block 114, or block 118 the present invention returns at 120 to decision block 62 of FIG. 3.

Figure 6:
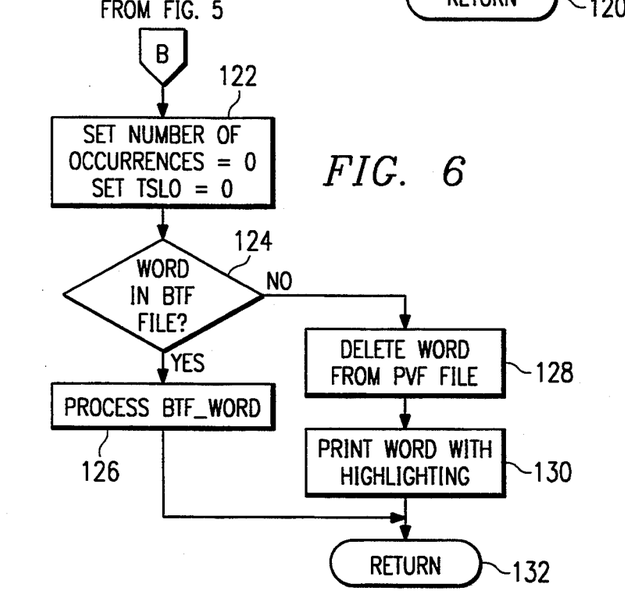

Referring to FIG. 6, the connector B from the no branch of decision block 102 in FIG. 5 is further discussed. At block 122, the number of occurrences field of the PVF file and the TSLO field are both set equal to zero. It is then determined at decision block 124 whether or not the word is in the BTF file. If the response thereto is yes, the word is processed as a BTF word as will be subsequently described with reference to FIG. 7. If the response to decision block 124 is no, the word is deleted from the PVF file at block 128. The word is then printed with highlighting at block 130. Subsequent to block 126 or block 130, the present invention returns at 132 to decision block 62 of FIG. 3.

Figure 7:
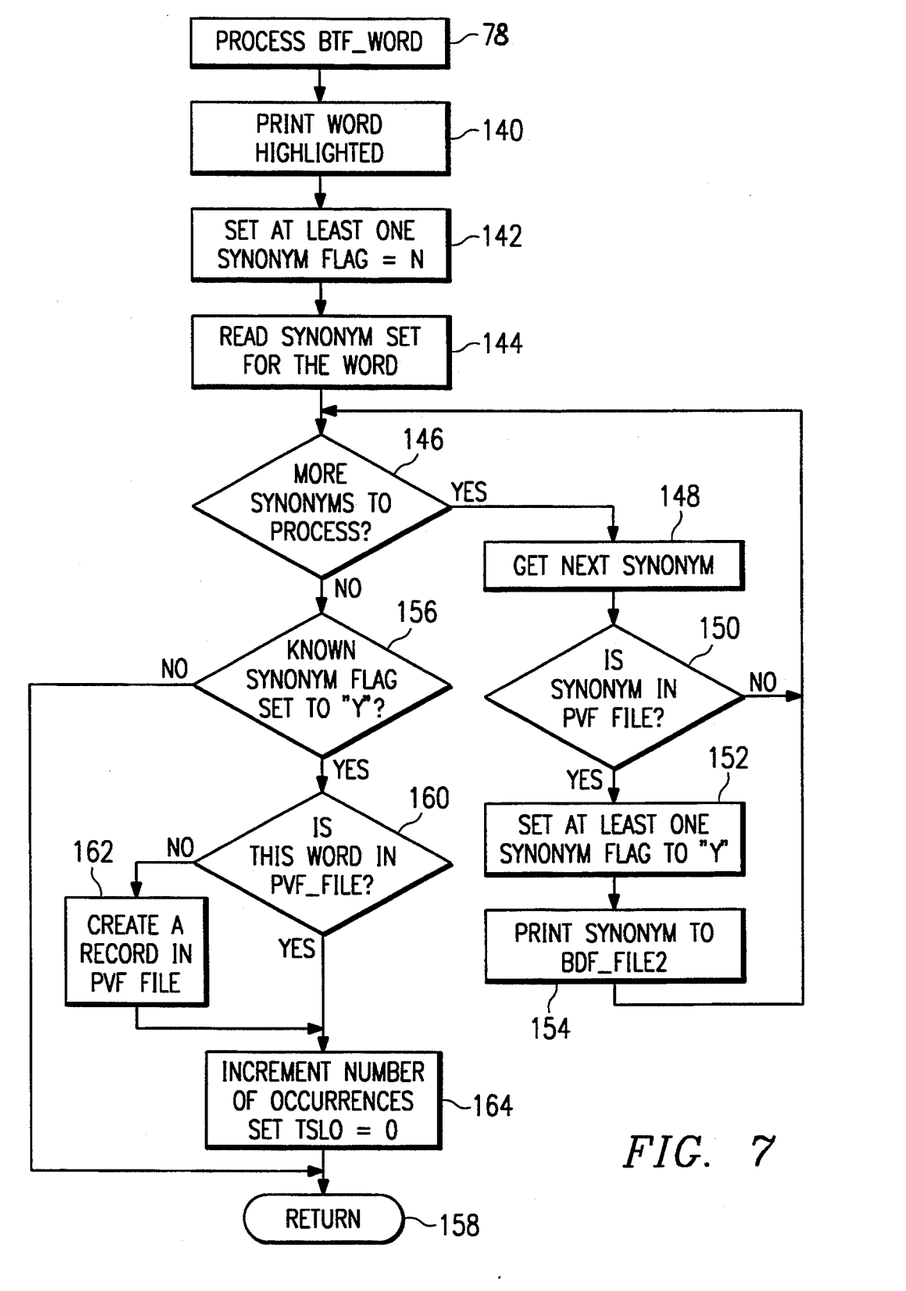

Referring to FIG. 7, the process BTF_WORD block 78 of FIG. 3 is discussed in greater detail. At block 140, the word is printed highlighted. At block 142, a synonym flag field for at least one synonym of the word is set to "N" (no). A set of synonyms is then read for the word at block 144. At decision block 146 it is determined whether or not there are more synonyms for the word to be processed. If the response to decision block 146 is yes, the next synonym is obtained at block 148. It is then determined at decision block 150 whether or not the synonym is in the PVF file. If the response to decision block 150 is no, the present invention returns to decision block 146. If the response to decision block 150 is yes, at least one synonym flag field is set to "Y" (yes) at block 152. The synonym is then printed to the BDF_FILE2 at block 154 followed by a return to decision block 146.

Returning to decision block 146, if the response thereto is no, it is determined at decision block 156 whether or not a known synonym field flag is set to "Y" (yes). If the response to decision block 156 is no, the present invention returns at 158 to decision block 62 of FIG. 3. If the response to decision 156 is yes, it is determined at decision block 160 whether or not this word is in the PVF_FILE. If the response to decision block 160 is no, a record of the word is created in the PVF file at block 162. If the response to decision block 160 is yes or subsequent to block 162, the number of occurrences field is incremented and the TSLO field is set to zero at block 164. The present invention then returns at 158 to decision block 62 of FIG. 3.

As an example, at startup of January 1, 1993, assume the COMP_TSLO parameter is set equal to twelve months and the COMP_NO parameter is set equal to two by a user of the present invention. The user's Personal Vocabulary File (PVF) is as follows:

| Word # | The Word | Known Word? | TSLO | Number of Occurrences |
|---|---|---|---|---|
| 1 | properly | Y | 0 | 0 |
| 2 | known | Y | 0 | 0 |
| 3 | name | Y | 0 | 0 |
| 4 | given | Y | 0 | 0 |
| 5 | tell | Y | 0 | 0 |
| 6 | former | Y | 0 | 0 |
| 7 | day | Y | 0 | 0 |
| 8 | good | Y | 0 | 0 |
| 9 | housewife | Y | 0 | 0 |
| 10 | country | Y | 0 | 0 |
| 11 | husband | Y | 0 | 0 |
| 12 | village | Y | 0 | 0 |
| 13 | market | Y | 0 | 0 |
| 14 | habitual | Y | 0 | 0 |
| 15 | liking | Y | 0 | 0 |
| 16 | tarry | Y | 0 | 0 |
| 17 | romantics | Y | 0 | 0 |
| 18 | always | Y | 0 | 0 |
| 19 | fall | Y | 0 | 0 |
| 20 | love | Y | 0 | 0 |
| 21 | candy | Y | 0 | 0 |
| 22 | child | Y | 0 | 0 |
| 23 | guest | Y | 0 | 0 |
| 24 | last | Y | 0 | 0 |

Note: Multiple occurrences of the same word in the same document are treated as a single occurrence for record keeping purposes.

The following indicates a portion of a passage input on the startup date as a BDF_FILE:

" . . . properly known by the name of Tarry Town. The name was given, we are told, in the former days, by the good housewives of the country, by the inveterate propensity of their husbands to linger about their village tavern on market days . . . ".

After being translated by the present invention, the following passage would be output:

" . . . properly known by the name of Tarry Town. The name was given, we are told, in the former days, by the good housewives of the country, from the inveterate {HABITUAL} propensity {LIKING} of their husbands to linger {TARRY} about their village tavern on market days . . . ".

As a result of the translation process, the PVF file as shown above would be modified as follows:

| Word # | The Word | Known Word? | TSLO | Number of Occurrences |
|---|---|---|---|---|
| 1 | properly | Y | 0 | 1 |
| 2 | known | Y | 0 | 1 |
| 3 | name | Y | 0 | 1 |
| 4 | given | Y | 0 | 1 |
| 5 | tell | Y | 0 | 1 |
| 6 | former | Y | 0 | 1 |
| 7 | day | Y | 0 | 1 |
| 8 | good | Y | 0 | 1 |
| 9 | housewife | Y | 0 | 1 |
| 10 | country | Y | 0 | 1 |
| 11 | husband | Y | 0 | 1 |
| 12 | village | Y | 0 | 1 |
| 13 | market | Y | 0 | 1 |
| 14 | habitual | Y | 0 | 1 |
| 15 | liking | Y | 0 | 1 |
| 16 | tarry | Y | 0 | 1 |
| 17 | romantics | Y | 0 | 0 |
| 18 | always | Y | 0 | 0 |
| 19 | fall | Y | 0 | 0 |
| 20 | love | Y | 0 | 0 |
| 21 | candy | Y | 0 | 0 |
| 22 | child | Y | 0 | 0 |
| 23 | guest | Y | 0 | 0 |
| 24 | last | Y | 0 | 0 |
| 25 | inveterate | N | 0 | 1 |
| 26 | propensity | N | 0 | 1 |
| 27 | linger | N | 0 | 1 |

Continuing the above example, on Mar. 1, 1993, the following passages are input:

" . . . Inveterate romantics are always falling in love."

" . . . The last guests lingered until 2 a.m."

" . . . Children have a propensity for candy."

As a result of translation, the following is output:

" . . . Inveterate {HABITUAL} romantics are always falling in love."

" . . . The last guests lingered {TARRIED} until 2 a.m."

" . . . Children have a propensity {LIKING} for candy."

As a result of the above translation, the PVF file is modified as follows:

| Word # | The Word | Known Word? | TSLO | Number of Occurrences |
|---|---|---|---|---|
| 1 | properly | Y | 2 | 1 |
| 2 | known | Y | 2 | 1 |
| 3 | name | Y | 2 | 1 |
| 4 | given | Y | 2 | 1 |
| 5 | tell | Y | 2 | 1 |
| 6 | former | Y | 2 | 1 |
| 7 | day | Y | 2 | 1 |
| 8 | good | Y | 2 | 1 |
| 9 | housewife | Y | 2 | 1 |
| 10 | country | Y | 2 | 1 |
| 11 | husband | Y | 2 | 1 |
| 12 | village | Y | 2 | 1 |
| 13 | market | Y | 2 | 1 |
| 14 | habitual | Y | 2 | 1 |
| 15 | liking | Y | 2 | 1 |
| 16 | tarry | Y | 2 | 1 |
| 17 | romantics | Y | 0 | 1 |
| 18 | always | Y | 0 | 1 |
| 19 | fall | Y | 0 | 1 |
| 20 | love | Y | 0 | 1 |
| 21 | candy | Y | 0 | 1 |
| 22 | child | Y | 0 | 1 |
| 23 | guest | Y | 0 | 1 |

-continued

| Word # | The Word | Known Word? | TSLO | Number of Occurrences |
|---|---|---|---|---|
| 24 | last | Y | 0 | 1 |
| 25 | inveterate | N | 0 | 2 |
| 26 | propensity | N | 0 | 2 |
| 27 | linger | N | 0 | 2 |

Continuing the above example, on Apr. 1, 1993, the following passage is input:

" . . . properly known by the name of Tarry Town. The name was given, we are told, in the former days, by the good housewives of the country, by the inveterate propensity of their husbands to linger about their village tavern on market days . . . ".

After translation, this passage is printed as:

". . . properly known by the name of Tarry Town. The name was given, we are told, in the former days, by the good housewives of the country, by the inveterate propensity of their husbands to linger about their village tavern on market days . . . ", i.e., no change is made to the text.

As a result of this passage's input, the PVF file becomes:

| Word # | The Word | Known Word? | TSLO | Number of Occurrences |
|---|---|---|---|---|
| 1 | properly | Y | 0 | 2 |
| 2 | known | Y | 0 | 2 |
| 3 | name | Y | 0 | 2 |
| 4 | given | Y | 0 | 2 |
| 5 | tell | Y | 0 | 2 |
| 6 | former | Y | 0 | 2 |
| 7 | day | Y | 0 | 2 |
| 8 | good | Y | 0 | 2 |
| 9 | housewife | Y | 0 | 2 |
| 10 | country | Y | 0 | 2 |
| 11 | husband | Y | 0 | 2 |
| 12 | village | Y | 0 | 2 |
| 13 | market | Y | 0 | 2 |
| 14 | habitual | Y | 1 | 2 |
| 15 | liking | Y | 1 | 2 |
| 16 | tarry | Y | 0 | 2 |
| 17 | romantics | Y | 0 | 1 |
| 18 | always | Y | 0 | 1 |
| 19 | fall | Y | 0 | 1 |
| 20 | love | Y | 0 | 1 |
| 21 | candy | Y | 0 | 1 |
| 22 | child | Y | 0 | 1 |
| 23 | guest | Y | 0 | 1 |
| 24 | last | Y | 0 | 1 |
| 25 | inveterate | Y | 0 | 3 |
| 26 | propensity | Y | 0 | 3 |
| 27 | linger | Y | 0 | 3 |

Thus, it can be seen that since the words in the passage as input meet the system parameters, there is no need for translation as the words are assumed to be known by the user.

Continuing the above example, on Jun. 1, 1994, the following passage is input;

" . . . Inveterate romantics are always falling in love."

As a result of translation, the passage becomes:

" . . . Inveterate {HABITUAL} romantics are always falling in love."

As a result of this translation, the PVF file has become:

| Word # | The Word | Known Word? | TSLO | Number of Occurrences |
|---|---|---|---|---|
| 1 | properly | Y | 14 | 0 |

-continued

| Word # | The Word | Known Word? | TSLO | Number of Occurrences |
|---|---|---|---|---|
| 2 | known | Y | 14 | 0 |
| 3 | name | Y | 14 | 0 |
| 4 | given | Y | 14 | 0 |
| 5 | tell | Y | 14 | 0 |
| 6 | former | Y | 14 | 0 |
| 7 | day | Y | 14 | 0 |
| 8 | good | Y | 14 | 0 |
| 9 | housewife | Y | 14 | 0 |
| 10 | country | Y | 14 | 0 |
| 11 | husband | Y | 14 | 0 |
| 12 | village | Y | 14 | 0 |
| 13 | market | Y | 14 | 0 |
| 14 | habitual | Y | 14 | 0 |
| 15 | liking | Y | 14 | 0 |
| 16 | tarry | Y | 14 | 0 |
| 17 | romantics | Y | 0 | 0 |
| 18 | always | Y | 0 | 0 |
| 19 | fall | Y | 0 | 0 |
| 20 | love | Y | 0 | 0 |
| 21 | candy | Y | 14 | 0 |
| 22 | child | Y | 14 | 0 |
| 23 | guest | Y | 14 | 0 |
| 24 | last | Y | 14 | 0 |
| 25 | inveterate | N | 0 | 1 |
| 26 | propensity | N | 14 | 0 |
| 27 | linger | N | 14 | 0 |

Thus, as can be seen from the above PVF file, as a result of the passage of time being greater than the COMP_TSLO parameter, the words in the passage which were previously considered known had once again become unknown to the user. The words were therefore translated as before and the appropriate adjustments made to the PVF file.

As a result of the present invention, a user is provided with a constantly updated Personal Vocabulary File which will allow the translation of words not known to the user into words that are known to the user. This will provide the user with greater ease in reading and understanding documents presented for review. The present invention eliminates or greatly reduces the need for the use of either an on-line dictionary/thesaurus or a printed hard copy thereof.

Although the present invention has been particularly shown and described with reference to a preferred embodiment, it will be understood by those skilled in the art that various changes in form and detail may be made without departing from the spirit and the scope of the invention.

What is claimed is:

1. A computer implemented method of teaching a specific individual reader and automatically improving comprehensibility of a document on a computer system for that reader, comprising the steps of:
   storing a business thesaurus file in a storage device accessible by the computer system;
   storing a list of reader identified known words in said storage device;
   associating reader defined parameters with said known words in order to ensure said known words are currently known to the reader;
   automatically comparing all words in the document to said list of known words to identify unknown words;
   automatically accessing said business thesaurus file to obtain a synonym for each of said unknown words, said synonym also being on said list of known words;

automatically updating said list of known words to remove words that have become not currently known and to add words that have become currently known in accordance with said reader defined parameters; and automatically displaying the document to the reader with said synonym displayed adjacent each of said unknown words corresponding thereto, wherein the reader learns a meaning of said unknown words and the document is automatically more comprehensible to the reader.

2. The computer implemented method of claim 1, wherein said step of associating comprises the steps of:

assigning a first numerical value to said known words to reflect how many occurrences of a word are required for said word to become a known word; and assigning a second numerical value to said known words to reflect a period of time of no occurrences after which a known word becomes an unknown word.

3. A computer system for teaching a specific individual reader and automatically improving comprehensibility of a document on the computer system for that reader, comprising:

means for storing a business thesaurus file in a storage device accessible by the computer system;

means for storing list of reader identified known words in said storage device;

means for associating reader defined parameters with said known words in order to ensure said known words are currently known to the reader;

means for automatically comparing all words in the document to said list of known words to identify unknown words;

means for automatically accessing said business thesaurus file to obtain a synonym for each of said unknown words, said synonym also being on said list of known words;

means for automatically updating said list of known words to remove words that have become not currently known and to add words that have become currently known in accordance with said reader defined parameters; and means for automatically displaying the document to the reader with said synonym displayed adjacent to each of said unknown words corresponding thereto, wherein the reader learns a meaning of said unknown words and the document is automatically more comprehensible to the reader.

4. The computer system of claim 3, wherein said means for associating comprises:

means for assigning a first numerical value to reflect how many occurrences of a word are required for said word to become a known word; and means for assigning a second numerical value to reflect a period of time of no occurrences after which a known word becomes an unknown word.

* * * * *